United States Patent Office
3,052,642
Patented Sept. 4, 1962

3,052,642
PROCESS OF MAKING GAS-EXPANDED ORGANO-PLASTIC MATERIAL USING NITROSOSULFONAMIDE BLOWING AGENT
Byron A. Hunter, Waterbury, Conn., assignor to United States Rubber Company, New York, N.Y., a corporation of New Jersey
No Drawing. Filed Nov. 2, 1954, Ser. No. 466,429
15 Claims. (Cl. 260—2.5)

This invention relates to the preparation of gas-expanded plastic materials, and more particularly to the preparation of closed-cell cellular rubber, with new organic chemical blowing agents adapted on thermal decomposition to yield nitrogen gas. Although the chemicals are primarily adapted to the production of closed-cell cellular rubber, they may also be used in the preparation of cellular rubber in which the cells are interconnecting as in so-called sponge rubber. They may also be used to expand organic plastic materials other than rubber such as thermoplastic resinous materials, for example, polyvinyl chloride and copolymers of a major proportion of vinyl chloride and a minor proportion of a co-polymerizable monomer. They may also be used to expand mixtures of rubber and compatible resins, such as the so-called gum plastics.

Although there are many chemicals that can be used to liberate nitrogen gas for gas-expanding plastic materials capable of being set or cured, many of them lack other desirable attributes that are necessary for commercial use, namely, little or no toxicity, non-discoloring and non-staining characteristics, low cost, ease of incorporation, ease of preparation, etc.

It is an object of the present invention to provide a new class of chemical blowing agents which have many of the above desired characteristics and use of which therefore constitutes an improvement in the art. Another object is to provide a class of chemical blowing agents which results in a fine cell structure and a blowing efficiency comparable with those achieved with p,p'-oxybis (benzene sulfonhydrazide) which is marketed under the trade-name "Celogen OT" and has been widely recognized as an outstanding chemical blowing agent.

The blowing agents of my invention are characterized by containing the sulfonitrosamide grouping,

and are termed N-nitroso sulfonamides or simply sulfo-nitrosamides. The free bond on the sulfur atom is attached to an organic radical, which can be either mono-functional or poly-functional, and the free bond on the nitrogen atom is attached to an organic radical (either mono-functional or poly-functional).

One class (Type A) of N-nitroso sulfonamides which can be used in practicing my invention comprises those having the formula

R—SO$_2$—N(NO)—R' wherein R is an aromatic radical (usually phenyl, alkyl-phenyl, oxybis (phenyl) or naphthyl) and R' is lower (not higher than C$_6$) alkyl. The aromatic radical R can be substituted with one or more of the

—SO$_2$—N(NO)—R' groups. Another class (Type B) of N-nitroso sulfon-amides which can be used in the practice of my invention have the formula

R—SO$_2$—N(NO)—R"—N(NO)—SO$_2$—R wherein R is aromatic and R" is alkylene. Usually the alkylene radical R" will not contain more than 3 carbon atoms.

The N-nitroso sulfonamides are typically prepared by suspending the corresponding sulfonamide in glacial acetic acid and adding sodium nitrite thereto. Typically an amount of sodium nitrite in substantial molar excess over the sulfonamide, say from 1.5 to 3 moles of sodium nitrite per sulfonamido group (—SO$_2$NH—) contained in the sulfonamide, is added gradually with stirring to the suspension of the sulfonamide in glacial acetic acid, the amount of the latter being sufficiently great to react with all of the sodium nitrite and provide an excess of acetic acid to serve as reaction medium, over a substantial period of time after which the mixture is allowed to stand for a substantial period during which time the product precipitates. The mixture is then filtered and the product is preferably freed of any sulfonamide by slurrying in dilute aqueous sodium hydroxide solution followed by filtration, washing with water and drying at low temperature. The reaction is usually carried out at room temperature, say 20–30° C.

Typical preparations are illustrated in the synthesis of N,N'-ethylene bis (N-nitroso benzenesulfonamide) and p,p'-oxybis (N-nitroso, N-methyl benzenesulfonamide):

N,N'-ETHYLENE BIS (N-NITROSO BENZENESULFONAMIDE)

Thirty-four grams (0.1 mole) of N,N'-ethylene bis (benzenesulfonamide) was suspended in 300 ml. of glacial acetic acid and 28 g. (0.4 mole) of sodium nitrite was added portionwise over a period of thirty minutes. The mixture was well stirred during the addition and for a further thirty minutes. After standing for another hour the crystalline product was filtered off and washed well with water. The product was then stirred with dilute sodium hydroxide to remove any unchanged sulfonamide and was again filtered and washed with water. The yellow crystalline product melted at 112–113° C.

p,p'-OXYBIS (N-NITROSO-N-METHYL BENZENESULFONAMIDE)

35.6 grams (0.1 mole) of p,p'-oxybis (N-methyl benzenesulfonamide) was suspended in 200 ml. of glacial acetic acid and 28 g. (0.4 mole) of sodium nitrite was added portionwise (with stirring) over a period of thirty minutes. The mixture was allowed to stand two hours and was then filtered, washed with acetic acid and then with water. The crystals were then stirred with dilute sodium hydroxide solution for ten minutes and then filtered and washed with water. The product (34 g.) melted at 129–130° C. with decomposition.

*Analysis.*—Calculated for C$_{14}$H$_{14}$O$_7$N$_4$S$_2$: percent S= 15.48; percent N=13.52. Found: percent S=15.24, 15.22; percent N=13.99, 14.06.

Examples of N-nitroso sulfonamides which can be used in the practice of my invention are the following:

Type A

N-nitroso-N-methyl benzenesulfonamide

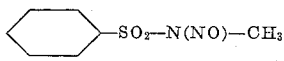

N-nitroso-N-ethyl benzenesulfonamide

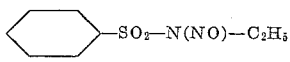

N-nitroso-N-methyl p-toluenesulfonamide

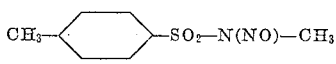

N-nitroso-N-ethyl p-toluenesulfonamide

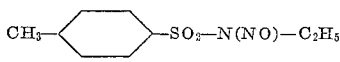

1,3 benzene bis (N-nitroso N-methyl sulfonamide)

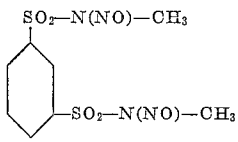

1,3 xylene bis (N-nitroso-N-methyl sulfonamide)

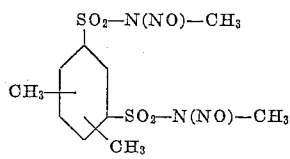

p,p'-oxybis (N-nitroso-N-methyl benzenesulfonamide)

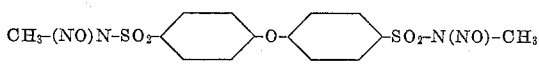

p,p'-oxybis (N-nitroso-N-ethyl benzenesulfonamide)

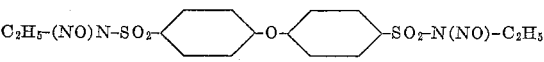

1,3-naphthalene bis (N-nitroso-N-methyl sulfonamide)

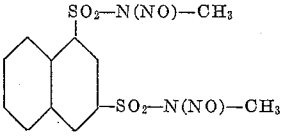

Type B 1,2-ethylene bis (N-nitroso benzenesulfonamide)

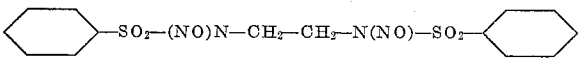

1,2-propylene bis (N-nitroso benzenesulfonamide)

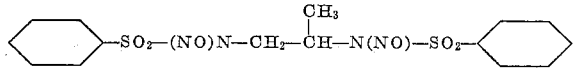

1,2-ethylene bis (N-nitroso-p-toluenesulfonamide)

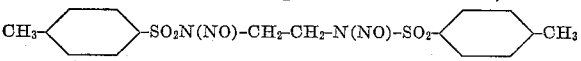

I believe that I am the first to prepare the chemical p,p'-oxybis (N-nitroso-N-methyl benzenesulfonamide).

The above examples aree illustrative and it is not intended that the invention be limited to these but rather that the invention be construed to include the use of any organic compound containing the above sulfonitrosamide grouping. It will be obvious that the N-nitroso sulfonamide compounds should be free from substituent groups which would interfere with the blowing action or which would have an undesirable effect upon the properties of the blowing agent or upon the properties of the expanded product. Thus, it should be free from groups imparting an undesirable toxic effect to the blowing agent and from groups causing an acceleration of degradation of the rubber or plastic material of the blown product.

The chemical blowing agents used in accordance with my invention can be easily and completely mixed with the rubber or other organic plastic material and do not impart an objectionable odor or color. Furthermore, they are non-staining to fabrics and coatings which may come in contact with the rubber or other organic plastic. They are also non-toxic.

The amount of the chemical, when used as the sole blowing agent will usually exceed 1% and can range up to 20%, or higher, by weight, based on the content of rubber or other organic plastic, depending upon the type of article being produced. However, as little as 0.1% can be used in conjunction with other blowing agents to obtain valuable effects. In the case of plastics other than natural or synthetic rubbers, the quantity of blowing agent may range as high as 30 or more parts, by weight, per 100 parts of the plastic.

The following examples are given to illustrate the invention, parts being by weight.

EXAMPLE I

A rubber masterbatch composition was prepared according to the following recipe:

| | |
|---|---|
| Smoked sheets (pre-milled to 20 Mooney) | 100.0 |
| Zinc oxide | 5.0 |
| Whiting | 100.0 |
| Stearic acid | 5.0 |
| Mineral oil | 15.0 |
| Sulfur | 3.0 |
| Tetramethyl thiuram disulfide | 0.35 |
| Total | 228.35 |

To separate portions of the above masterbatch composition were added 1.5 parts by weight of a number of the blowing agents of the invention. A similar mix was prepared using p,p'-oxybis (benzenesulfonhydrazide). The resulting stocks (40 g. each) were placed in cylindrical molds (2.75" diameter x 0.75" deep) and cured for 20 minutes at the temperature of 80 lbs. p.s.i. steam (about 324° F.). A 40 g. portion of the masterbatch containing no blowing agent was cured for comparison. The cured sponge samples were removed from the molds and after standing 24 hours were measured for volume and density determinations. The data obtained are shown in the following table:

| Chemical | Volume (cu. in.) | Density (g./cu.in.) | Cell Structure |
|---|---|---|---|
| N - Nitroso - N - methyl - p - toluene - sulfonamide | 4.17 | 9.6 | fine. |
| N - Nitroso - N - ethyl - p - toluene - sulfonamide | 4.17 | 9.6 | fine. |
| p,p' - Oxybis (N - nitroso - N - methyl benzenesulfonamide) | 4.45 | 9.0 | fine. |
| p,p' - Oxybis (N - nitroso - N - ethyl benzenesulfonamide) | 4.15 | 9.65 | fine. |
| 1,2-Ethylene bis (N-nitroso benzenesulfonamide) | 3.98 | 10.0 | fine. |
| p,p'-Oxybis (benzenesulfonhydrazide) ("Celogen OT") | 4.07 | 9.85 | fine. |
| No blowing agent | 2.2 | 18.2 | poor and coarse. |

It can be seen that each of the chemicals of the invention produced a marked expansion of the rubber composition and resulted in a cellular product similar to that from "Celogen OT" in both cell structure and degree of expansion.

EXAMPLE II

A somewhat different rubber masterbatch composition was made up according to the following recipe:

| | |
|---|---|
| Smoked sheets (milled to 25 Mooney) | 100.0 |
| Zinc oxide | 5.0 |
| Whiting | 30.0 |
| Lithopone | 30.0 |
| Mineral oil | 10.0 |
| Stearic acid | 10.0 |
| Sulfur | 3.0 |
| Bis benzothiazyl disulfide | 1.0 |

To separate portions of the above masterbatch were added 1.5 parts of 1,2-ethylene bis (N-nitroso-p-toluenesulfonamide) and p,p'-oxybis (benzenesulfonhydrazide) ("Celogen OT"). 30 g. of each of these stocks, along with a 30 g. portion of the masterbatch containing no blowing agent, were cured for 25 minutes at the temperature of 60 lbs. p.s.i. steam (about 308° F.) The resulting cellular pieces were removed from the molds and measured after 24 hours of storage. The following data were obtained:

| Blowing Agent | Volume (cu. in.) | Density (g./cu. in.) | Cell Structure |
| --- | --- | --- | --- |
| 1,2-Ethylene bis (N-nitroso-p-toluenesulfonamide) | 4.54 | 6.6 | fine. |
| p,p'-Oxybis (benzenesulfonhydrazide) ("Celogen OT") | 4.35 | 6.9 | fine. |
| None | 2.78 | 10.8 | coarse and non-uniform. |

With the rubber may be incorporated the usual compounding ingredients, including curing or vulcanizing ingredients such as sulfur, accelerators, activators, antioxidants, plasticizers, softeners, pigments, fillers, dyestuffs, etc. If desired, reclaimed rubber may be incorporated in the mix. The rubber may be first broken down on the mill whereupon the blowing agent may be added followed by other ingredients, curatives usually being added last. After compounding, it is often preferred to allow the stock to stand for a day or more before carrying out the blowing and curing step or steps.

The manipulative methods of treating the compounded stock to obtain the expanded product are those which are well-known and standard in the art. For details of the art of making chemically gas-expanded plastics such as rubber, attention may be directed to the article "Cellular Rubbers," by Gould, Rubber Chemistry and Technology, volume 17, pages 943–956 (October 1944), and U.S. Patents to Cuthbertson No. 2,291,213 and to Roberts et al. No. 2,299,593. It is well within the present skill of the art, in the light of this disclosure, to compound a stock containing my blowing agent and process it so as to obtain either a sponge or a closed cell type of product.

The decomposition temperatures for gas-expanding by means of my chemical blowing agents may range from 80° C. to 200° C. Accordingly, the organic plastic material should be capable of setting to a normally solid state and have sufficient consistency and tensile strength at temperatures of from about 80° C. to about 200° C. to retain the expanded structure resulting from the subsequent heating step involving decomposition of the blowing agent with evolution of nitrogen gas and expansion of the mass either in the mold or when removed therefrom.

Although the specific examples given above show gas-expanding natural rubber, my invention is not limited thereto but can be applied to other organic plastics and mixtures thereof, such as are shown in U.S. Patent to Richmond et al. No. 2,448,154, e.g., alkyd resins, urea-formaldehyde resins, polymerized unsaturated materials such as polyacrylonitrile, polystyrene, polyvinyl chloride, copolymers of vinyl chloride and copolymerizable monomers such as vinyl acetate, amorphous non-resinous plastic materials such as cellulose esters, cellulose ethers, synthetic rubbers such as the rubbery copolymers of butadiene and styrene (GR-S), rubbery copolymers of butadiene and acrylonitrile (Buna N), rubbery copolymers of isobutylene and butadiene or isoprene ("Butyl rubber"), neoprene (polychloroprene), polyisobutylene, olefin polysulfides ("Thiokols"), etc. The preferred aspect of the invention is concerned with chemically blown cellular rubber because of its wider commercial advantages in competition with foamed rubber latex products.

The organic plastic may be of either the thermoplastic or the thermosetting type and it may be of a type of which polymerization is furthered or completed during the step of heating to generate the gas. Examples of thermosetting resins are the phenol-formaldehyde resins which are capable of being advanced by the action of heat or of heat and a methylene-yielding hardening agent. Other examples of thermosetting resins to which my invention is applicable are mixtures of unsaturated linear polyesters and copolymerizable monomers such as are disclosed in U.S. Patent to Ellis No. 2,255,313, e.g., the so-called "Vibrins."

As is indicated above, my invention can be used for gas-expanding compatible rubber-resin blends such as blends of GR-S and a resinous styrene-butadiene copolymer or blends of Buna N rubber and a thermoplastic resin e.g., a styrene-acrylonitrile resinous copolymer, such as are shown in U.S. Patents to Daly No. 2,439,202 and Romeyn et al. No. 2,600,024. My invention can also be applied to the production of gas-expanded mixtures of Buna N rubber, a vinyl resin compatible therewith, and an organic liquid plasticizer for the vinyl resin such as is exemplified in Daly et al. No. 2,570,182.

Having thus described my invention, what I claim and desire to protect by Letters Patent is:

1. The method of making a gas-expanded organic plastic material which comprises mixing an N-nitroso sulfonamide of the formula R—$SO_2$—N(NO)—R' wherein R is an aromatic radical and R' is selected from the group consisting of lower alkyl groups and groups of the formula —R''—N(NO)—$SO_2$—R wherein R is as previously defined and R'' is an alkylene radical containing not more than three carbon atoms with a gas-expandable, gas-retentive, organic polymeric plastic material, which organic plastic is capable of setting to a normally solid state and having sufficient consistency and tensile strength at temperatures of from 80° C. to 200° C. to retain the expanded structure resulting from the subsequent heating step, and decomposing said N-nitroso sulfonamide by heat to evolve nitrogen gas and expand said organic plastic material.

2. The method of claim 1 wherein said N-nitroso sulfonamide is N-nitroso-N-methyl-p-toluenesulfonamide.

3. The method of claim 1 wherein said N-nitroso sulfonamide is N-nitroso-N-ethyl-p-toluenesulfonamide.

4. The method of claim 1 wherein said N-nitroso sulfonamide is p,p'-oxybis (N-nitroso-N-ethyl benzenesulfonamide).

5. The method of claim 1 wherein said N-nitroso sulfonamide is p,p'-oxybis (N-nitroso-N-ethyl benzenesulfonamide).

6. The method of claim 1 wherein said N-nitroso sulfonamide is 1,2-ethylene bis (N-nitroso benzenesulfonamide).

7. The method of making a gas-expanded rubber which comprises mixing an N-nitroso sulfonamide of the formula R—$SO_2$—N(NO)—R' wherein R is an aromatic radical and R' is selected from the group consisting of lower alkyl groups and groups of the formula

—R''—N(NO)—$SO_2$—R wherein R is as previously defined and R'' is an alkylene radical containing not more than three carbon atoms with rubber, decomposing said N-nitroso sulfonamide by heat to evolve nitrogen gas and expand said rubber, and curing the rubber to cause it to retain its expanded condition.

8. The method of claim 7 wherein said N-nitroso sulfonamide is N-nitroso-N-methyl-p-toluenesulfonamide.

9. The method of claim 7 wherein said N-nitroso sulfonamide is n-nitroso-N-ethyl-p-toluenesulfonamide.

10. The method of claim 7 wherein said N-nitroso sulfonamide is p,p'-oxybis (N-nitroso-N-methyl benzenesulfonamide).

11. The method of claim 7 wherein said N-nitroso sulfonamide is p,p'-oxybis (N-nitroso-N-ethyl benzenesulfonamide).

12. The method of claim 7 wherein said N-nitroso sulfonamide is 1,2-ethylene bis (N-nitroso benzenesulfonamide).

13. p,p'-Oxybis (N-nitroso-N-methyl benzenesulfonamide).

14. A method for making a gas expanded rubber with a rubber selected from the group consisting of natural rubber and polymers of butadiene 1,3 which comprises mixing said rubber with 1,2-ethylene bis (N-nitrosotoluenesulfonamide) and heating to evolve nitrogen gas and expand said rubber, and curing the rubber to cause it to retain its expanded condition.

15. A method for making a gas-expanded organoplastic material which comprises mixing said organoplastic material with 1,2-ethylene-bis-(N-nitroso toluene sulfonamide) and heating to evolve nitrogen gas and expand said material, and curing the material to cause it to retain its expanded condition.

References Cited in the file of this patent

UNITED STATES PATENTS

| | | |
|---|---|---|
| 2,491,709 | Briggs et al. | Dec. 20, 1949 |
| 2,529,512 | Ott | Nov. 14, 1950 |
| 2,532,240 | Ott | Nov. 28, 1950 |
| 2,552,065 | Schoene | May 8, 1951 |
| 2,626,933 | Lober et al. | Jan. 27, 1953 |
| 2,683,696 | Muller | July 13, 1954 |
| 2,744,076 | Breuer et al. | May 1, 1956 |
| 2,754,326 | Bradley et al. | July 10, 1956 |

FOREIGN PATENTS

| | | |
|---|---|---|
| 224,388 | Germany | Mar. 18, 1909 |

OTHER REFERENCES

Inrfelt, Berichte, 22 R, 692 (1889).

UNITED STATES PATENT OFFICE
CERTIFICATE OF CORRECTION

Patent No. 3,052,642                          September 4, 1962

Byron A. Hunter

It is hereby certified that error appears in the above numbered patent requiring correction and that the said Letters Patent should read as corrected below.

In the heading to the printed specification, line 4, for "AGENT" read -- AGENTS --; column 3, line 62, for "aree" read -- are --; line 67, for "compounds" read -- compound --; column 6, line 44, for "-ethyl" read ---methyl --.

Signed and sealed this 15th day of January 1963.

(SEAL)
Attest:

ERNEST W. SWIDER
Attesting Officer

DAVID L. LADD
Commissioner of Patents